Patented Dec. 17, 1929

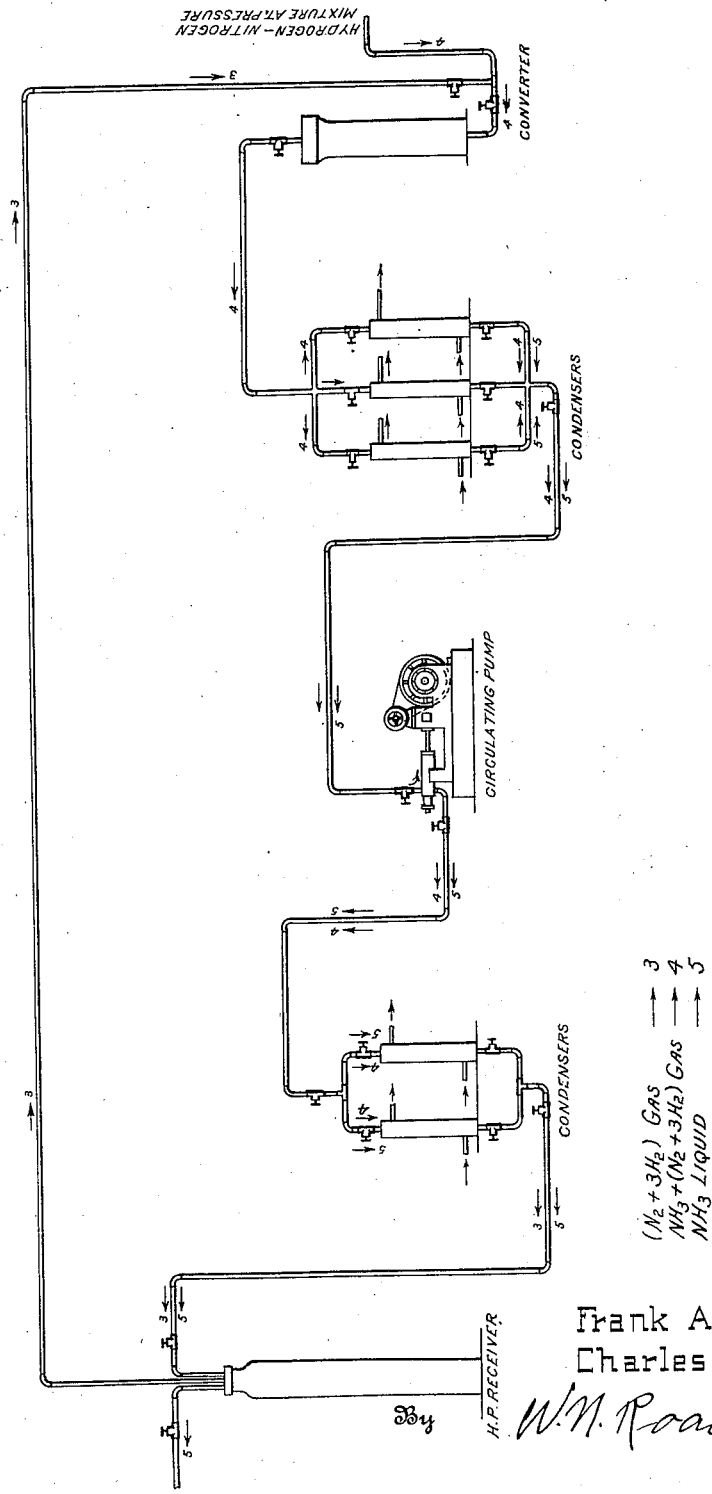

1,739,957

UNITED STATES PATENT OFFICE

FRANK A. ERNST, OF SOMERSET, MARYLAND, AND CHARLES H. YOUNG, OF SEATTLE, WASHINGTON, ASSIGNORS TO ARTHUR B. LAMB, TRUSTEE

USE OF AMMONIA AS A LUBRICANT

Application filed June 24, 1926. Serial No. 118,355.

This invention relates to lubrication and more particularly to the lubrication of apparatus used in or about the handling or production of ammonia.

The main object of the present invention is to provide means for lubricating the working parts of such apparatus with a lubricant which will not contaminate the ammonia or have a deleterious effect upon the ammonia or on any of the substances used in its production.

This object is attained by supplying ammonia, preferably in a liquid state, to the working parts to lubricate the same.

In carrying out the process ammonia is supplied, under pressure where necessary, to the working parts.

An apparatus in which the invention may be practiced is illustrated in the accompanying drawing which is a flow diagram of a direct synthetic ammonia process.

Where the invention is used in conjunction with a system for the synthetic production of ammonia it may be conveniently carried out by cooling the ammonia gas, or a suitable portion thereof, as produced in the converter, to a sufficient extent to liquefy a desirable amount thereof and then supplying such liquefied ammonia, as necessary, to the working parts, such as the piston rod and piston of the circulating pump, for the purpose of lubricating and cooling the same.

As an example, let us apply this ammonia lubrication to the circulating pumps or compressors, hereinafter referred to as circulating pump, used in what is known as the cyclical system of producing ammonia by direct synthesis of its elements; nitrogen and hydrogen, by passing said elements, mixed in the proper proportions, over a suitable catalyst in the converter at an elevated temperature and pressure. The pressures used at the present time vary from 100 to 900 atmospheres. The temperature is usually 450° C. and higher, depending on the catalyst used and the pressure at which reaction takes place. The gases are then cooled and the ammonia removed. The remaining unconverted gases are then recirculated through the apparatus through means of a suitable circulating pump. The cycle is repeated as many times as is necessary for the complete conversion of all the nitrogen and hydrogen gases into ammonia gas; hydrogen and nitrogen gas being supplied at the operating pressure to make up for the volume of gas converted into ammonia gas and removed. The inert and other impure gases accumulating are purged either periodically or continuously.

To apply the present system of ammonia lubrication in such a process, any well known cooling means such as the condenser A is placed between the converter B of the ammonia producing apparatus and the circulating pump C so that the gases coming from the converter may be cooled to a sufficient extent to liquefy the ammonia, or a suitable portion thereof, and the ammonia together with the gases remaining, or the ammonia alone is then led to the suction side of the circulating pump where the ammonia is used to lubricate the working parts of the pump and from thence through suitable cooling apparatus D to the collector or receiver E where the liquid ammonia is recovered and the gases together with newly supplied gases are recirculated through the system. A small portion of the ammonia may be permitted to leak by the piston, causing expansion of the ammonia and consequent absorption of heat and thereby cooling the piston rod. The piston of the usual pump has a sufficiently loose fit to permit leakage of some ammonia thereby and, if not, a looser fit may be supplied the piston, or by passes, or other means of permitting such leakage may be resorted to.

Obviously there are various methods of carrying out the present invention and it is not intended to limit the same by the foregoing description except in so far as such limitation may be regarded by the following claims when construed in the light of the prior art.

We claim:

1. A lubricating system for ammonia apparatus, embodying the step of supplying ammonia to the parts of the circulating pump to be lubricated.

2. In a system for the synthetic production of ammonia, including recirculating the unconverted gases; the step of cooling the gases as produced to liquefy ammonia, and supplying ammonia, thus liquefied, as a lubricant to the circulating pump.

3. In a system for the synthetic production of ammonia, including recirculating the unconverted gases; the step of supplying liquid ammonia, as produced, as a lubricant to the circulating pump.

4. A process of ammonia lubrication of a circulating pump in the cyclic system for the production of ammonia by the synthesis of its elements in the presence of a catalyst under a raised temperature and pressure, which comprises cooling the gases as produced to liquefy ammonia, and conducting such liquefied ammonia to the moving parts of the circulating pump.

5. A process of ammonia lubrication of a circulating pump in the cyclic system for the production of ammonia by the synthesis of its elements in the presence of a catalyst under a raised temperature and pressure, which comprises cooling the gases to liquefy gaseous ammonia, and then admitting liquefied ammonia to the circulating pump for the purpose of lubricating the piston and piston rod thereof.

6. A process of ammonia lubrication of a circulating pump in the cyclic system for the production of ammonia by the synthesis of its elements in the presence of a catalyst under a raised temperature and pressure, which comprises cooling the gases as produced to liquefy ammonia, admitting the gases and ammonia to the circulating pump for purpose of lubricating the moving parts thereof, then further cooling the gases and ammonia to recover ammonia, then recirculating the unconverted gases.

7. A process for ammonia lubrication of a circulating pump in the cyclic system for the production of ammonia by the synthesis of its elements in the presence of a catalyst under a raised temperature and pressure, which comprises cooling the gases as produced to liquefy ammonia, introducing the liquefied ammonia to the circulating pump to lubricate the parts thereof, and then expanding the ammonia whereby the heat is absorbed and the working parts of the pump cooled.

8. A process of ammonia lubrication of a circulating pump in the cyclic system for the production of ammonia by the synthesis of its elements in the presence of a catalyst under a raised temperature and pressure, which comprises cooling the gases as produced to liquefy ammonia, admitting liquefied ammonia to the circulating pump whereby parts of the pump are lubricated, and withdrawing part of the ammonia whereby expansion takes place absorbing heat and cooling parts of the pump.

FRANK A. ERNST.
CHARLES H. YOUNG.